Nov. 29, 1938.  J. W. CHALMERS  2,138,728
WRAPPING MACHINE
Filed Aug. 23, 1937  13 Sheets-Sheet 4

INVENTOR
J. W. Chalmers,
By Watson, Coit, Morse &
Grindle, ATTYS.

Nov. 29, 1938.　　　J. W. CHALMERS　　　2,138,728
WRAPPING MACHINE
Filed Aug. 23, 1937　　13 Sheets-Sheet 6

INVENTOR
J. W. Chalmers,
By Watson, Coit, Morse
& Grindle

Nov. 29, 1938. J. W. CHALMERS 2,138,728
WRAPPING MACHINE
Filed Aug. 23, 1937 13 Sheets-Sheet 7

INVENTOR
J. W. Chalmers,
By Watson, Coit, Morse & Grindle
ATTYS.

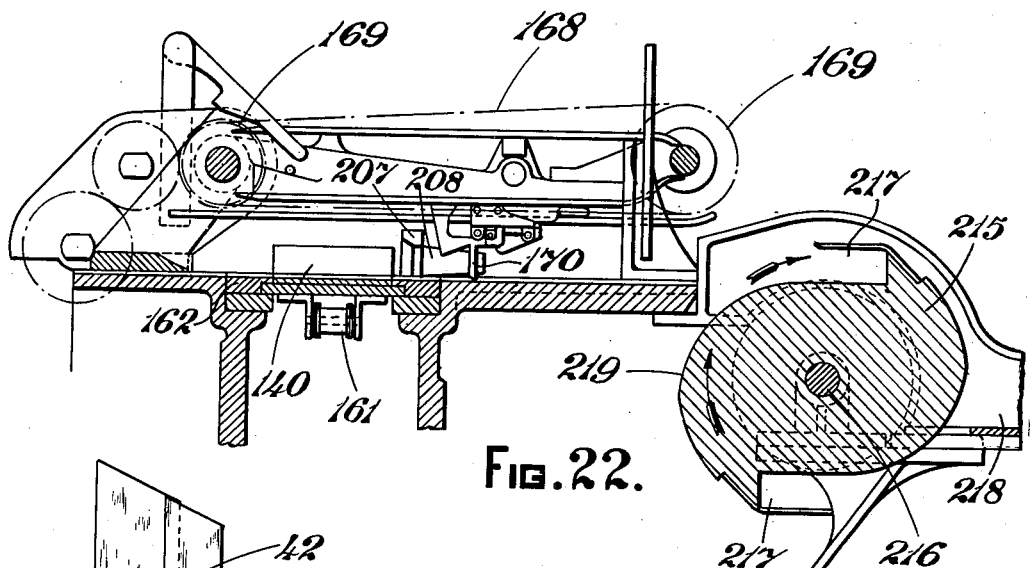
FIG. 22.
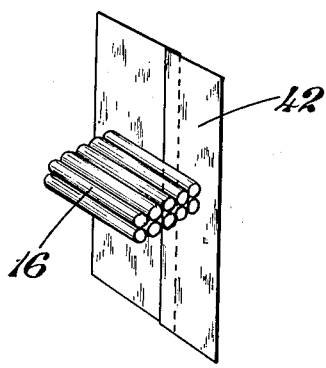
FIG 9
FIG. 10.
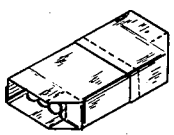
FIG. 11.
FIG. 12.
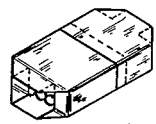
FIG. 13.
FIG. 14.
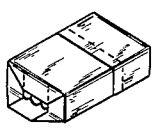
FIG. 15.
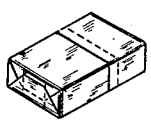
FIG. 16.

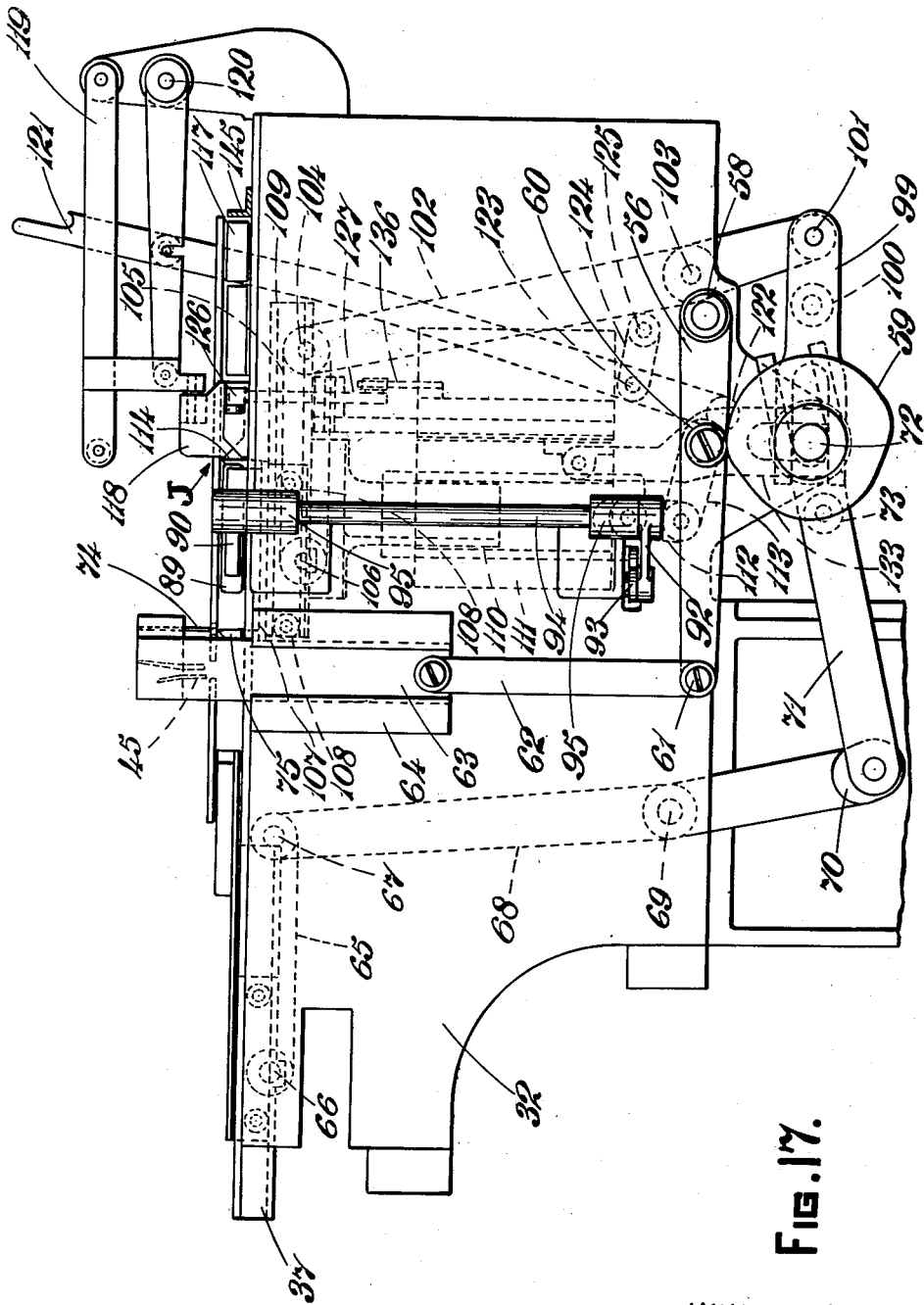

Nov. 29, 1938.  J. W. CHALMERS  2,138,728
WRAPPING MACHINE
Filed Aug. 23, 1937  13 Sheets-Sheet 10
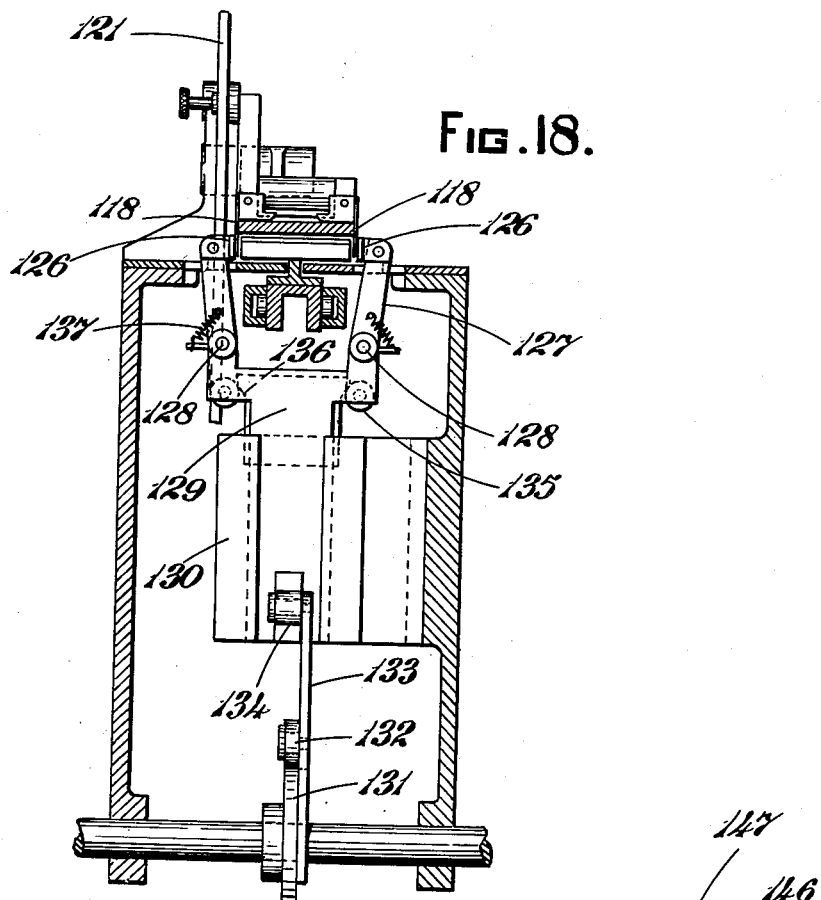
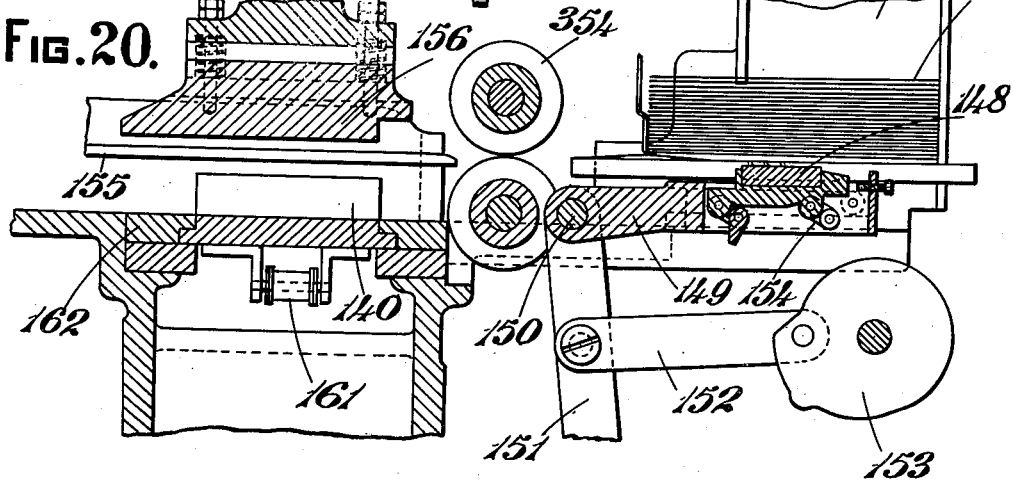
INVENTORS
J. W. Chalmers
By Watson, Coit, Morse & Grindle Nov. 29, 1938.  J. W. CHALMERS  2,138,728
WRAPPING MACHINE
Filed Aug. 23, 1937  13 Sheets-Sheet 12

Nov. 29, 1938.  J. W. CHALMERS  2,138,728
WRAPPING MACHINE
Filed Aug. 23, 1937    13 Sheets-Sheet 13
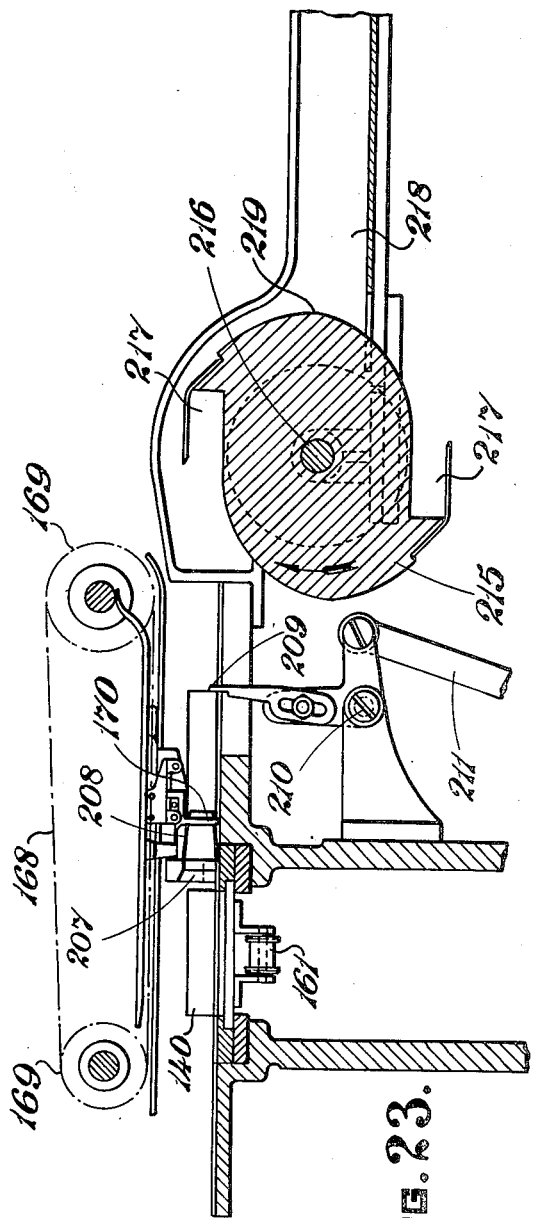
INVENTOR
J. W. Chalmers
By Watson, Coit, Morse & Guidee
ATTYS.

Patented Nov. 29, 1938

2,138,728

UNITED STATES PATENT OFFICE 2,138,728

WRAPPING MACHINE

John Walker Chalmers, Deptford, London, England, assignor to Molins Machine Company, Limited, London, England Application August 23, 1937, Serial No. 160,530
In Great Britain August 26, 1936

11 Claims. (Cl. 93—2)

This invention is for improvements in or relating to wrapping machines and refers to a machine in which an article or a batch of articles is wrapped in a protective covering prior to its insertion into an outer container.

In the embodiment described below the machine is arranged for wrapping and packing batches of cigarettes comprising a plurality of superimposed rows of cigarettes. It is, however, to be understood that other articles may be wrapped by machines constructed in accordance with the invention as set forth in the appended claims.

One object of the invention is to provide a machine for enveloping an article in a protective wrapper composed of two portions of wrapping material which are arranged to overlap each other, and thereby form a composite wrapper which completely envelops the said article but in which each portion only envelops one end of the article.

When articles are wrapped in such composite wrappers it is possible for a consumer to remove and throw away one of the portions in order to gain access to the contents of the wrapper instead of tearing away a portion of the wrapper as is necessary when the article is enveloped in a single wrapper whether composite or otherwise.

Other objects of the invention will hereinafter appear and are set forth in the appended claims.

The invention may be carried out in various ways within the scope of the appended claims, and the specific embodiment described with reference to the accompanying drawings is given by way of example.

In the drawings:—

Figures 9 to 16 show the sequence of operations involved in completely folding the wrapping material around the article.

Figure 17 is a side elevation taken in the direction of arrow "C", Figure 1, and shows a view rather similar to Figure 6, but taken in the opposite direction.

Figure 18 is a section on line 6—6, Figure 4, and shows details of wrapper folding and tucking mechanism.

Figure 20 is a section on line 7—7, Figure 1, and show details of the slide feed mechanism to a larger scale than in Figure 19.

Figure 22 is a section on line 8—8, Figure 1, and shows mechanism for feeding the loaded slide into the shell and ejecting the finished article.

Figure 23 is a similar view to Figure 22 showing further details.

The machine comprises an assemblage of units which will be first generally indicated and afterwards described in greater detail.

A cigarette hopper is provided from which cigarettes are removed and assembled in batches on a conveyor which carries the cigarettes axially along a machine bed. Each batch is in turn transferred to another bed arranged at right angles to the one previously mentioned, and the batches are moved along the second bed into wrapping mechanism having suitable wrapping material feeds where the batches are each enclosed in such material. The wrapped batches are then conveyed along a third bed arranged at right angles to the second, that is, it is parallel to the first mentioned bed. The batches are delivered one at a time to a conveyor on a fourth bed arranged at right angles to the third bed. This conveyor has carton slides delivered thereto at a position prior to that at which it receives the wrapped batches, the parts being so arranged and timed that each batch is deposited on a slide. During the transit on the conveyor the flaps of the slide are folded as necessary about the wrapped batch, and the folded slide is moved off the conveyor at right angles to the path thereof and into an open shell which has meanwhile been fed from a magazine and positioned to receive the loaded slide. The finished article is then discharged from the machine.

Cigarette feed

Figure 1:
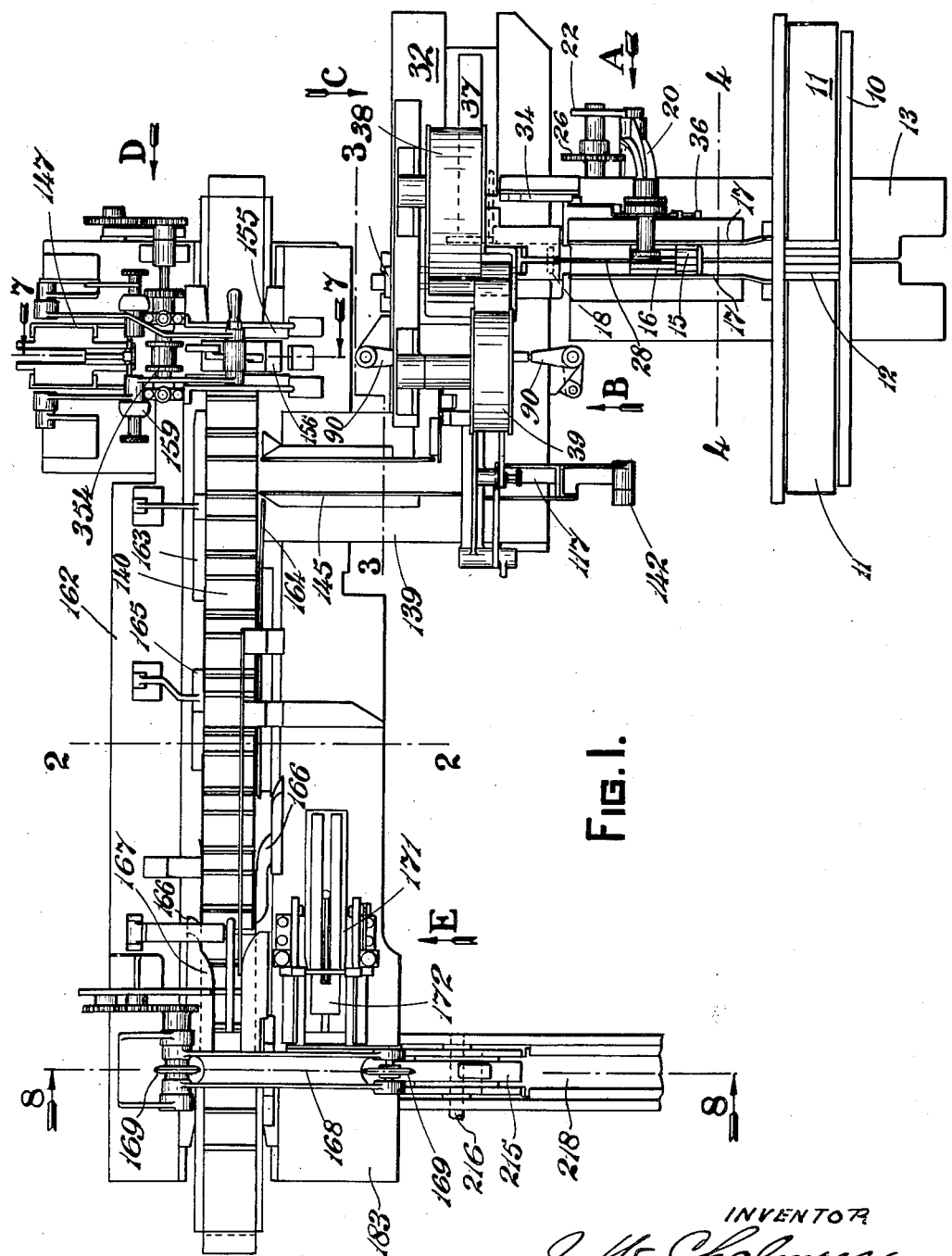
Figure 1 is a plan view of the whole machine.

This is shown in Figure 1 and consists of a hopper or box 10 having bottom plates 11 which slope down to an outlet consisting of a group of vanes 12 so that the cigarettes pass down the slots between the vanes on to the first bed 13 of the machine. The bed 13 is fitted with an endless conveyor, for instance, a chain conveyor 14, Figure 5, having pushers 15 mounted on it at regularly spaced intervals. Each pusher conveys a batch of cigarettes 16 of any desired number of rows along the bed 13.

The batches may be removed "en bloc" from the bottom of the vane slots by the pusher 15 or a batch may be built up by removing a row at a time from the vanes and assembling the desired number of rows by superimposing them on the machine bed prior to engagement by the pusher 15. When each pusher reaches the end of its traverse on the upper surface of the bed 13 and has thereby delivered the batch on to a bed 32 it passes below the surface and returns beneath the bed as may be seen from Figure 5, which shows the conveyor 14 in chain lines. Guides 17 are provided to control the cigarettes laterally while moving along the bed. The batch of cigarettes 16 remains stationary for a time on the bed 32 with the rear ends of the cigarettes at the position marked F in Figure 5 and is afterwards moved by transfer mechanism about to be described and accurately located on the second machine bed 32.

Cigarette transfer mechanism

Figure 4:
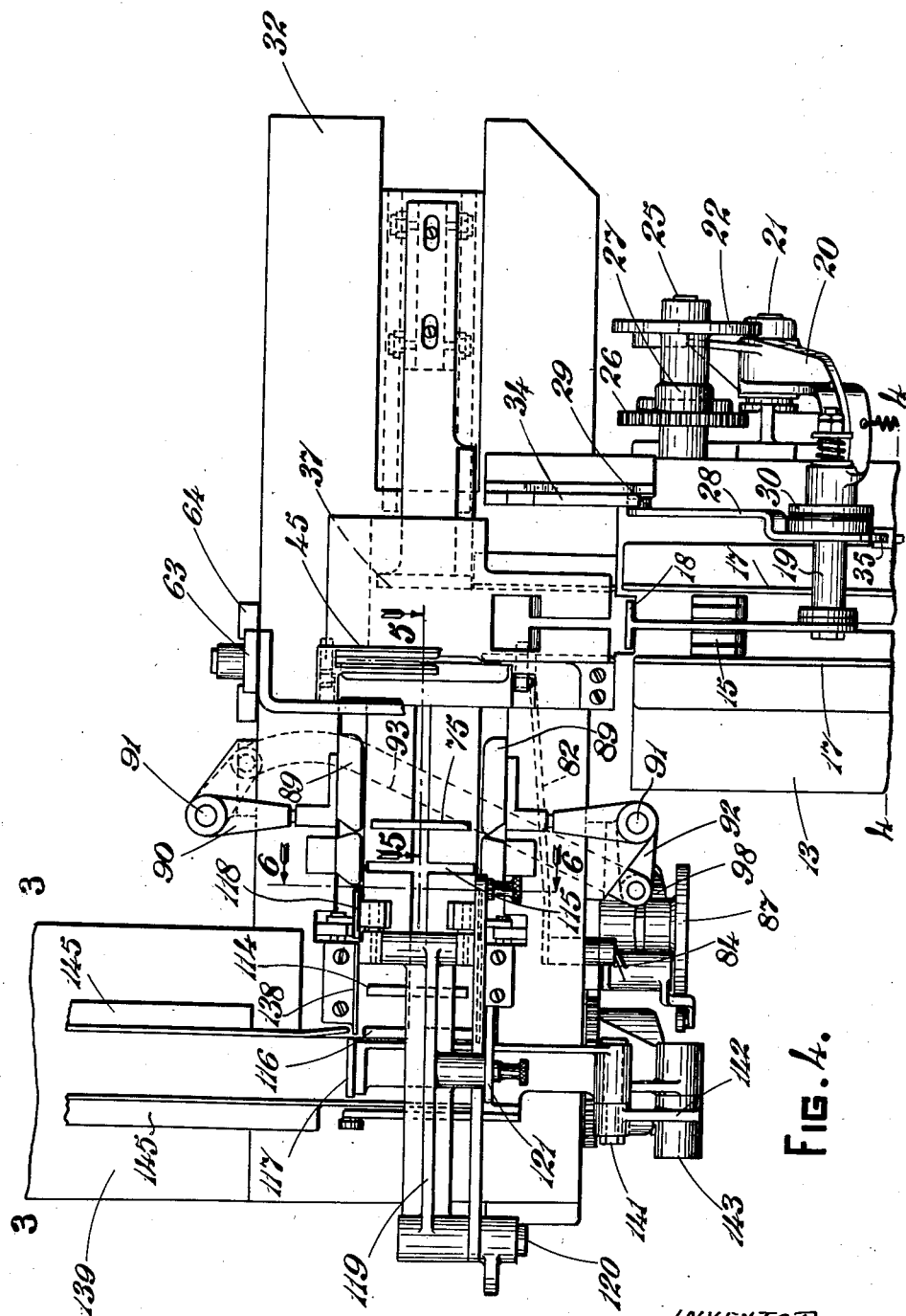
Figure 4 is a plan to the larger scale of the portion lying between lines 3—3 and 4—4, Figure 1.
Figure 5:
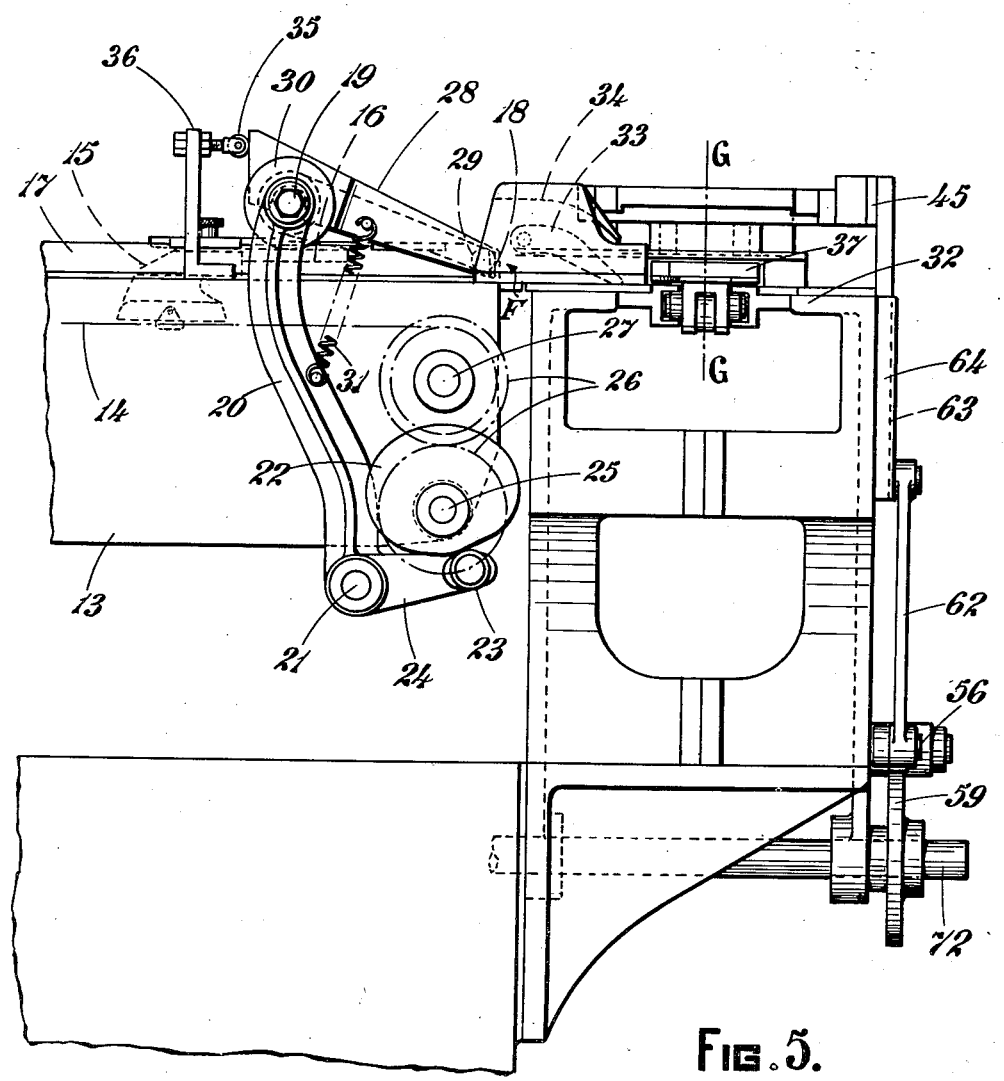
Figure 5 is a side elevation taken in the direction of arrow "A", Figure 1, and shows cigarette transfer mechanism.

This is shown in Figures 1, 4 and 5 and comprises a pusher 18 which is pivoted at 19 to a lever 20. The lever 20 is pivoted at 21 to the bed 13 and is oscillated on its pivot by a cam 22 which engages a roller 23 on lever 24. The cam is fixed to a spindle 25 which is journalled in the bed 13 and rotated by gears 26, the upper one, Figure 5, of which is fixed to the spindle 27 of the conveyor 14. At the pivot 19 there is fitted a lever 28 which is rigidly attached to the pusher 18 and has a roller 29 at its other end. The relative positions of pusher 18 and lever 28 may be adjusted by screws in a circular flange 30 which is fixed to pusher 18 and to which the lever 28 is clamped by the said screws. A spring 31 between levers 20 and 28 urges the members towards one another about the pivot 19.

In Figure 5 the pusher 18 is about to engage the batch of cigarettes which has been brought on to the bed 32 by a pusher 15 and left stationary with the rear ends of the cigarettes at F. As the lever 20 swings around pivot 21 in a clockwise direction, as viewed in Figure 5, the pusher 18 engages the batch and moves it so that it is disposed symmetrically about the line G—G which is the centre of a conveyor mentioned later. During this movement of the pusher 18 the roller 29 passes beneath a pivoted pawl 33, but on the return stroke the roller runs up over the top surface of the pawl and thus the pusher does not obstruct the movement of the succeeding batch which is being brought along to point F by the pusher 15 shown at the left hand of Figure 5. A fixed cam surface 34 prevents the roller 29 from lifting too high and thus keeps the pusher 18 under proper control during its return movement. A roller 35 pivoted to bracket 36 strikes the end of lever 28 and forces pusher 18 down on to the bed at the end of its return movement, ready to engage the succeeding batch at point F.

Wrapping mechanism

This is described with reference to Figures 1, 4, 6, 7 and 8, the operations being described with reference to Figures 9–16, and consists essentially of a machine bed having a conveyor which carries a batch laterally into contact with sheets of wrapping material fed into the path thereof. Further movement causes the sheets to be wrapped around the batch into tubular form, and the ends of the tube which project beyond the ends of the cigarettes are thereafter tucked and folded to complete the wrapping. In this case the conveyor consists of a reciprocating plunger 37 which moves along the middle of the bed 32.

The wrapping material, for example, tin foil, is supplied from one or two reels 38, 39, Figure 1, which are arranged so that when two portions are used the two webs may be brought together to overlap laterally by about ⅜″. The overlapping webs are fed downwardly into the path of the batch of cigarettes by a pair of rollers 339 and 40, Figure 6, the roller 339 being positively driven while the roller 40 which rotates freely is carried in a yoke 41 which is pivoted so that the roller 40 may be moved away from roller 39 to enable the webs to be threaded into the machine. The joint web 42, comprising the overlapping webs led from the reels 38 and 39, Figures 7 and 8, passes through guides 43, 44, 45, Figure 6, and a piece of the necessary length is cut off as soon as the material has been gripped by the batch of cigarettes as explained later with reference to Figures 7 and 8. The cutter consists of a moving knife 46 which co-operates with a relatively fixed knife 47. The movable knife is mounted on a carrier 48 slidably mounted on a pair of rods 49. The fixed knife is mounted on a bridge piece fixed across the rods 49 and is thus fixed relatively to the moving knife although it shares an up and down movement of the latter, as described below.

The rods are pivoted at 50 to a point on the frame of the mechanism and a cam roller 51 mounted on carrier 48 runs in a track cam 52. It will be seen that as the cam 52 rotates, the movable knife will be reciprocated in a direction parallel to the rods 49.

The web 42 is cut while it is in motion, in order to obtain speedy operation, and it is therefore necessary that the knives shall move downwardly during the cutting operation at the same rate as the web is travelling. This movement is given to the knives by a cam 53 which engages a roller 54 mounted on an extension of the knife carrier 48. The cams 52 and 53 rotate at the same number of revolutions per minute and are of such form that the knife moves downwardly at the same speed as the web while the cut takes place. As the knife moves up again it is widely separated from the fixed knife to avoid obstruction to the oncoming travelling web. In this manner the web of material is brought to the position shown in chain lines 42 in Figure 7, and cut an instant later as described below.

Figure 7:
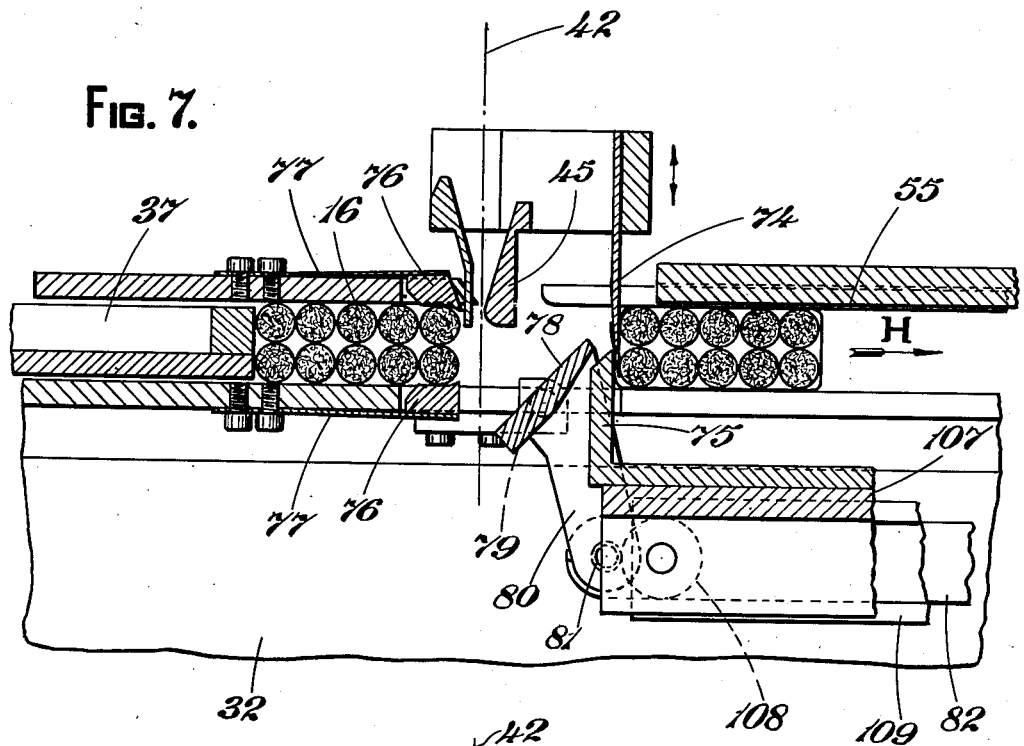
Figures 7 and 8 are sections on line 5—5, Figure 4, showing the mechanism for folding the wrapping material round the cigarettes, in two different operative positions.

The plunger 37 pushes the batch of cigarettes 16 laterally against the web 42, Figure 7, as the guides 45 which are moved up and down rise to clear the batch and the material is at this instant severed so that a wrapper blank is cut off from the web 42. See also Figure 9.

Figure 8:
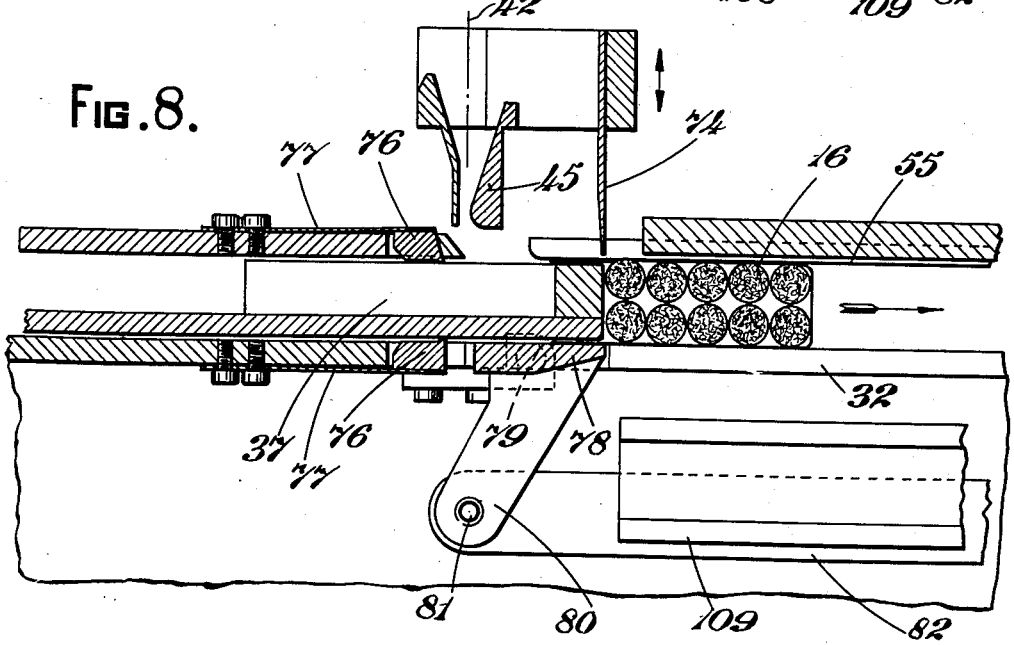
Figure 19:
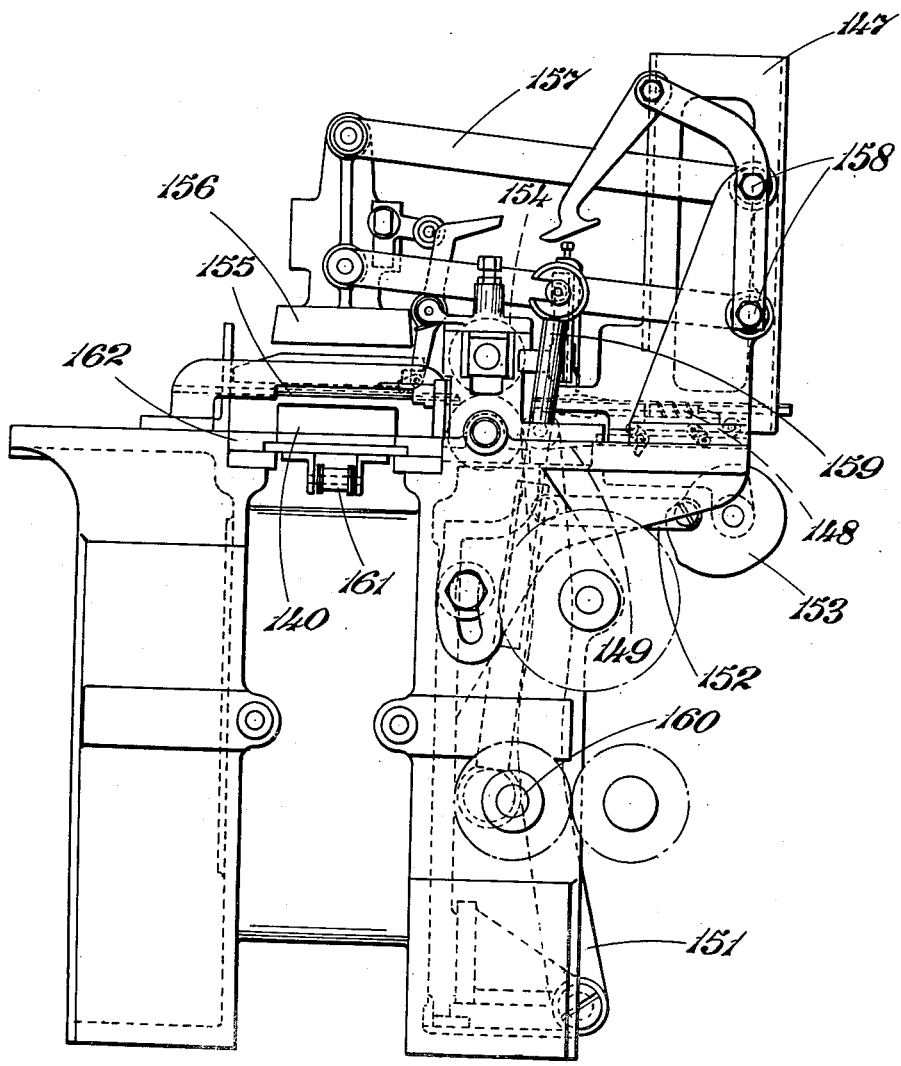
Figure 19 is a side elevation taken in the direction of arrow "D", Figure 1, and shows slide feed mechanism.

Further movement of the plunger carries the blank and the batch to the position shown in Figure 8. The wrapper is thus folded into U form about the batch, see Figure 10, by the action of the bed 32 and a top plate 55. The guide 45 is reciprocated vertically by a lever 56, Figure 17, pivoted to the frame at 58 and oscillated by a cam 59 through roller 60. The free end of lever 56 is connected at 61 to a link 62 which reciprocates a slide 63 in guides 64. The guide 45 is fixed to the upper part of slide 63.

Figure 17 also shows how the plunger 37 is actuated. A link 65 is connected to the plunger at 66 and also at 67 to a lever 68 which is pivoted at 69 to the frame. The other arm of lever 68 is connected to 70 to a cam rod 71 which has a forked end slidable on the shaft 72 on which cam 59 is fixed. A roller 73 engages with a box cam (not shown) on shaft 72, and thus the plunger 37 is moved to and fro at the necessary times.

After the wrapper blank is folded about the batch of cigarettes into a U as shown in Figure 8, the ends of the limbs of the U are folded down over the rear face of the batch, see Figures 11 and 12, in the following manner. The guide 45, Figure 7, has a tucker plate 74 fixed to it so that it reciprocates with such guide. There is also a lower folder 75 which also serves as a conveyor to move the batch from the position shown in Figure 7 in the direction of the arrow H as explained hereafter. This folder-conveyor travels through a rectangular path in a manner to be described later in detail. As shown in Figure 7 it is about to move horizontally in the direction of arrow H, to carry away the batch illustrated and after a certain movement it drops down vertically and leaves the partly wrapped batch stationary. It then returns horizontally to a position beneath that shown in Figure 7, and then rises vertically to the position indicated, where it engages a fresh batch. During this last vertical movement it functions as a folder and bends the projecting portion of the lower limb of the U upwardly on to the rear face of the batch 16. Just before the movement is completed, the tucker plate 74 moves downwardly and folds down the projecting portion of the upper limb of the U on to the rear face of the batch so that the folded portion will lie beneath the portion folded by folder 75 when the whole operation is completed. The parts are shown in Figure 7 in the position occupied when the tucker 74 has just finished folding down the projecting portion of the upper limb of the U.

At this stage the wrapper is folded into a tube around the batch with the ends of the tube projecting beyond the end faces of the batch. See Figure 12 and Figure 13 which latter figure shows the tube after one further operation has taken place.

In order to correct any tendency the cigarettes of the batch may have to roll way from plunger 37 when the batch is in the position shown on the left in Figure 7, retaining members 76 are provided. These are carried by springs 77 fixed by screws as shown and act as ratchets or latches which check undesired movement of the cigarettes, but give when the cigarettes are pressed forwards by the plunger and permit them to pass.

It will also be seen from Figure 7 that in order to provide an unobstructed path for the foil, the bed 32 is cut away and it is therefore necessary to bridge this gap at the time the batch is moved across in order to obtain proper folding. A pivoted bridge is fitted for this purpose and comprises a plate 78 pivoted to the bed at 79 and mechanically operated at the necessary intervals to move from the position shown in Figure 7 to that shown in Figure 8 and back again. To obtain this movement the plate 78 has an extension 80 connected at 81 to a link 82. The link is connected also, at 83, Figure 6, to a lever 84 pivoted at 85 to the frame. The other arm of the lever carries a roller 86 which engages with a cam 87 and a spring 88 is provided so that as the cam rotates, the plate 79 is moved to and fro on its pivot.

Figure 6:
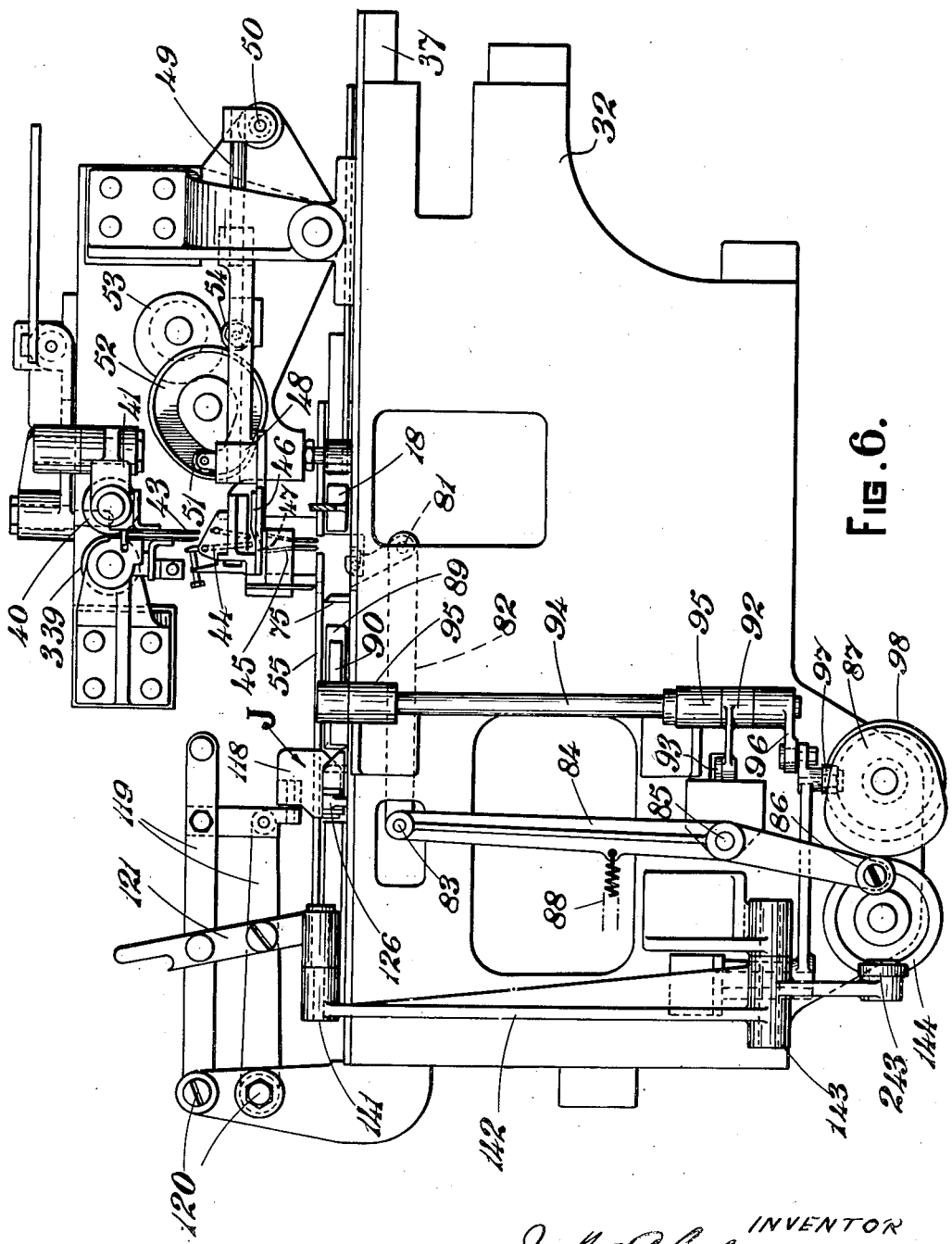
Figure 6 is a side elevation taken in the direction of arrow "B", Figure 1, and shows wrapper feeding and package transfer mechanism.

After the tube has been formed as above described the conveyor 75 moves the partly wrapped batch in the direction of the arrow H, Figure 7, until it reaches the position indicated by J, Figures 6 and 17, where further tucking and folding operations take place. The narrow extensions of the tube are first folded in as indicated in Figures 13 and 14, and thereafter the broad flaps or extensions are folded in the sequence indicated by Figures 15 and 16, the latter figure showing a completely wrapped batch.

The leading pair of narrow folds are folded down during the movement to position J as shown in Figure 13 by moving the partly wrapped batch against a pair of tuckers 89, Figure 4. At this moment the tuckers are stationary, but immediately the tucks are made they are moved away from the travelling partly wrapped batch and snap in again a little later to overtake the packet and make the rear narrow tucks as shown in Figure 14. The tuckers 89 are fixed to levers 90 pivoted at 91 and operated by levers 92 which are coupled by a bent link 93, Figure 4. As may be seen from Figures 6 and 17 the levers 92 are at a much lower level than the levers 90, and operative connection is made by vertical shafts 94 mounted in bearings 95 on the frame. A lever 96 at the lower end of one of the shafts 94 has a roller 97 which runs in a groove in a cylindrical cam 98 mounted on the same shaft as cam 87. The rotation of this cam 98 thus furnishes the required movements to the tuckers 89.

In an alternative arrangement the leading narrow tucks may be made by pushing the partly wrapped batch between a pair of fixed folders and almost simultaneously making the rear tucks with rotatable or other folders moving at such speed as to overtake the moving batch and form the tucks before the rear of the batch reaches the fixed folders.

When the tucking operation is completed the partly wrapped batch is delivered to a position just beyond the tucking position and comes to rest, the conveyor ceasing to act on it at this position, and at this stage it will be convenient to describe the conveyor and its operation in more detail.

In Figure 17 there is shown a slotted cam rod 99 having a roller 100 which engages with a cam (not shown) on the shaft 72. The rod 99 is connected at 101 to a lever 102 pivoted to the frame at 103. The upper end of lever 102 is pivoted at 104 to a link 105. The link 104 is connected at 106 to a sliding carriage 107 shown more clearly in Figure 7, to which the conveyor-folder 75 is fixed. The carriage has four rollers 108 which run in a grooved support rail 109, see Figures 7, 8, and 17. This rail is mounted on a slide 110 which works in vertical guides 111, Figure 17, and at its lower end has a link 112 attached to it. The link 112 is pivoted to a lever 113 which is in turn pivoted to the frame at the position 58 where lever 56 is also pivoted and operated by another cam on the shaft 72. It will be seen, therefore, that as the machine works the rail 109 will be reciprocated vertically and the carriage 107 will be reciprocated on the rail, thus giving to the conveyor 75 the rectangular movement previously referred to. The carriage 107 has another conveyor 114 fixed at its other end, see Figures 4 and 17 and the bed 32 has two transverse slots 115 and 116 of such size as to permit the conveyors 75 and 114 to pass through when moving vertically.

In operation the conveyor 75 rises through the hole in the bed at the foil feeding position as shown in Figure 7, while the conveyor 114 rises through the slot 115, Figures 4 and 17. The carriage then moves in the direction of arrow H, Figure 7, and folding takes place as above described. When conveyor 75 reaches slot 115 it is lowered through the slot, the conveyor 114 simultaneously passing through slot 116. The partly wrapped batch is thus left stationary at J, where further folding takes place and the two conveyors return beneath the bed to rise once more as described above. The conveyor 75 then engages a new batch while conveyor 114 engages the batch which is stationary at J and moves it into the path of a pusher 117, Figures 1, 4 and 17, where it is dealt with in a manner to be described hereafter.

While a batch is stationary at J at which position it is in the condition shown in Figure 14, folding mechanism engages the batch and folds the remaining flaps as indicated in Figures 15 and 16. The mechanism for performing these operations is shown in Figures 4, 6, 17 and 18.

The upper flaps are folded down as shown in Figure 15 by folders 118 consisting of a pair of flat plates carried on a pair of parallel links 119 pivoted at 120 to the frame. The links are oscillated on their pivots by a rod 121 which has a cam roller 122 at its lower end engaging a further cam on shaft 72, see Figure 17. The rod 121 is pivoted at 123 to a link 124 which is in turn pivoted to the frame at 125. As the cam rotates the rod rises and falls and thus causes the folders 118 to be moved up and down in what is practically a straight line path. The parts are so timed that the folders are in the "up" position as the partly wrapped batch approaches position J and when the batch comes to rest the folders are lowered and bend down the upper flaps on to the ends of the batch. The folders remain in the "down" position for a time, during which lower folders 126 are moved upwardly to fold the lower flaps on to the outer surfaces of folders 118. When this has been done, the plates 118 rise again, but the flaps they have folded are prevented from springing open by the lower folds which are held in position by folders 126.

The folders 126 are carried on levers 127 pivoted at 128 to a slide 129, see Figure 18. The slide is reciprocated in vertical guides 130 by a cam 131 which engages a roller 132 on a cam rod 133 pivoted to the slide 129 at 134. The folders are thus caused to rise at the appropriate time and fold up the lower flaps on to the folders 118 as above described. The folders 118 are withdrawn just before the upward movement of the slide 129 is completed, and then the folders 126 are caused to move towards one another to press the folds together.

This movement is effected as follows:—

The ends of levers 127 remote from the folders 126 carry rollers 135 which run on a fixed cam plate 136. The cam is of such shape that as the slide 129 is approaching the end of its movement the rollers 135 are forced away from one another, thus causing the folders 126 to approach one another. Springs 137 are fastened to the levers 127 at one end and at the other to pins fixed to the slide 129 so that the rollers 135 are urged towards one another by the spring tension and ride on the surfaces of the fixed cam.

The folding operations are now completed and the wrapped batch is moved by the conveyor 114 into the path of pusher 117 as above mentioned, being controlled in its movement by guides 138, Figure 4.

*Package transfer mechanism*

The pusher 117 operates to move wrapped batches one at a time along a bed 139 in a direction at right angles to the movement through the wrapping mechanism and to deliver them to pockets 140, Figure 1, carried on an intermittent conveyor.

Figure 3:
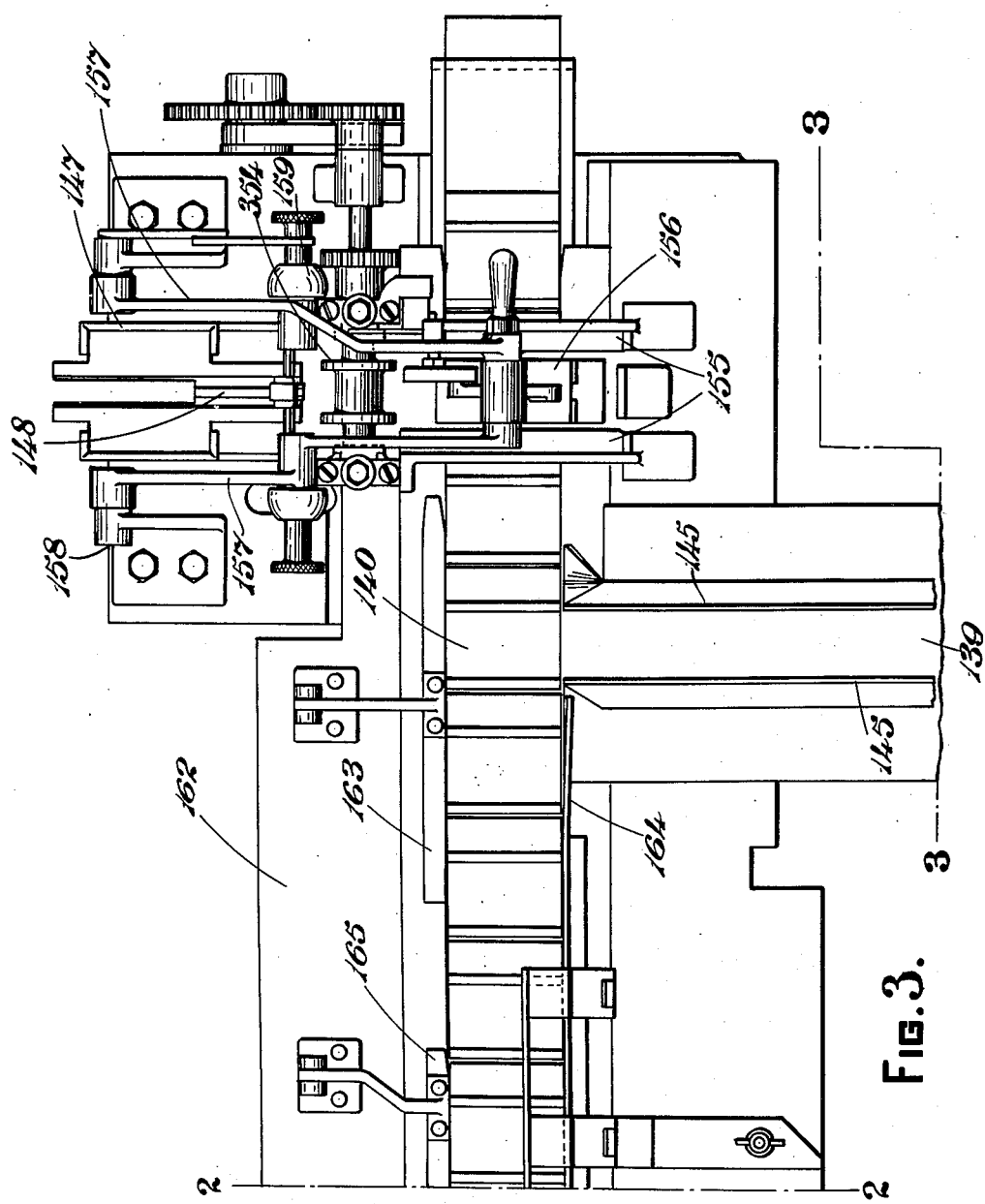
Figure 3 is a plan to a larger scale of the portion lying between the lines 2—2 and 3—3, Figure 1.

The pusher 117 is pivoted at 141 to a lever 142, see Figures 4 and 6, which is pivoted at 143 to the machine frame. An extension of the lever 142 carries a roller 243 which engages a crown cam 144 so that as the cam rotates the pusher 117 is reciprocated. The package is guided by guides 145 during its movement on the bed 139 and is ultimately brought into the pocket 140 which is stationary at the time, see Figure 3. As previously stated, a slide or inner of a slide and shell carton is delivered to the pocket before it receives the package and the mechanism for feeding this slide to the pocket will now be described.

*Slide feed*

Referring to Figures 1, 3, 19 and 20, flat slides 146 are stacked in a magazine 147 and removed one at a time from the base of the stack by a needle pad 148, Figure 20, which is moved to and fro by a carrier 149 pivoted at 150 to a link 151 which is oscillated by a connecting rod 152 connected to a rotatable crank disc 153. The needle pad is attached to the carrier 149 by parallel links 154, the arrangement being such that on the outward stroke the links are in the position shown in Figure 20 and permit the needles to engage with the bottom slide while on the return stroke the links drop and permit the needles to return at a lower level than that of the bottom slide. The crank disc 153 has its rim formed as a cam which raises the needle pad into operative engagement with a slide on the next outward stroke.

The slide passes between rotating feed rollers 354 which deliver it on to ledges 155 which support it by the side flaps which are common to such slides. A former or punch 156 then descends and presses the slide between the ledges 155 into a pocket 140 carried on an intermittently driven chain conveyor 161. During this movement the conveyor is stationary and the various parts are so shaped that the side panels of the slide are bent to an upright position so that the slide becomes a shallow trough of rectangular cross-section.

The former 156 is carried by a pair of parallel links 157 pivoted at 158 to a bracket on the machine frame and oscillated on their pivots by a connecting rod 159 which is connected at its other end to a crank disc 160. Rotation of the crank disc causes the former 156 to rise and fall at the proper times and bend up the side panels of the slide as above described.

*Pocket conveyor*

The pockets 140 are mounted on a chain conveyor 161 and guided along a channel in the bed 162, see Figure 20. The conveyor is intermittently driven by any suitable drive and is arranged to be stationary at each position where material is to be delivered to and from it. The design of the machine is such that during a single stationary period a slide is delivered to one pocket, a package to another and a loaded slide, as hereinafter described, is removed from another pocket, the operations all taking place contemporaneously.

Thus each pocket as it leaves the slide feed position contains a slide with bent up side flaps. When a pocket containing a slide reaches the position opposite the guides 145 on the bed 139, the pusher 117 delivers a wrapped batch on to it. The batch is located endwise in position during its transit on the conveyor by guides 163, 164 and 165. When the slide carrying the batch reaches the part of the machine shown on the right hand side of Figure 2, the end flaps of the slide are turned upwards vertically by folders 166 of the usual ploughshare pattern and then the upper portions of such flaps are turned down on to the surface of the batch by further folders 167 and in this way a completely folded and loaded slide is obtained. The slide is next removed laterally from the pocket conveyor by an ejector conveyor and thrust into an open shell which lies in its path.

*Ejector conveyor*

Figure 2:
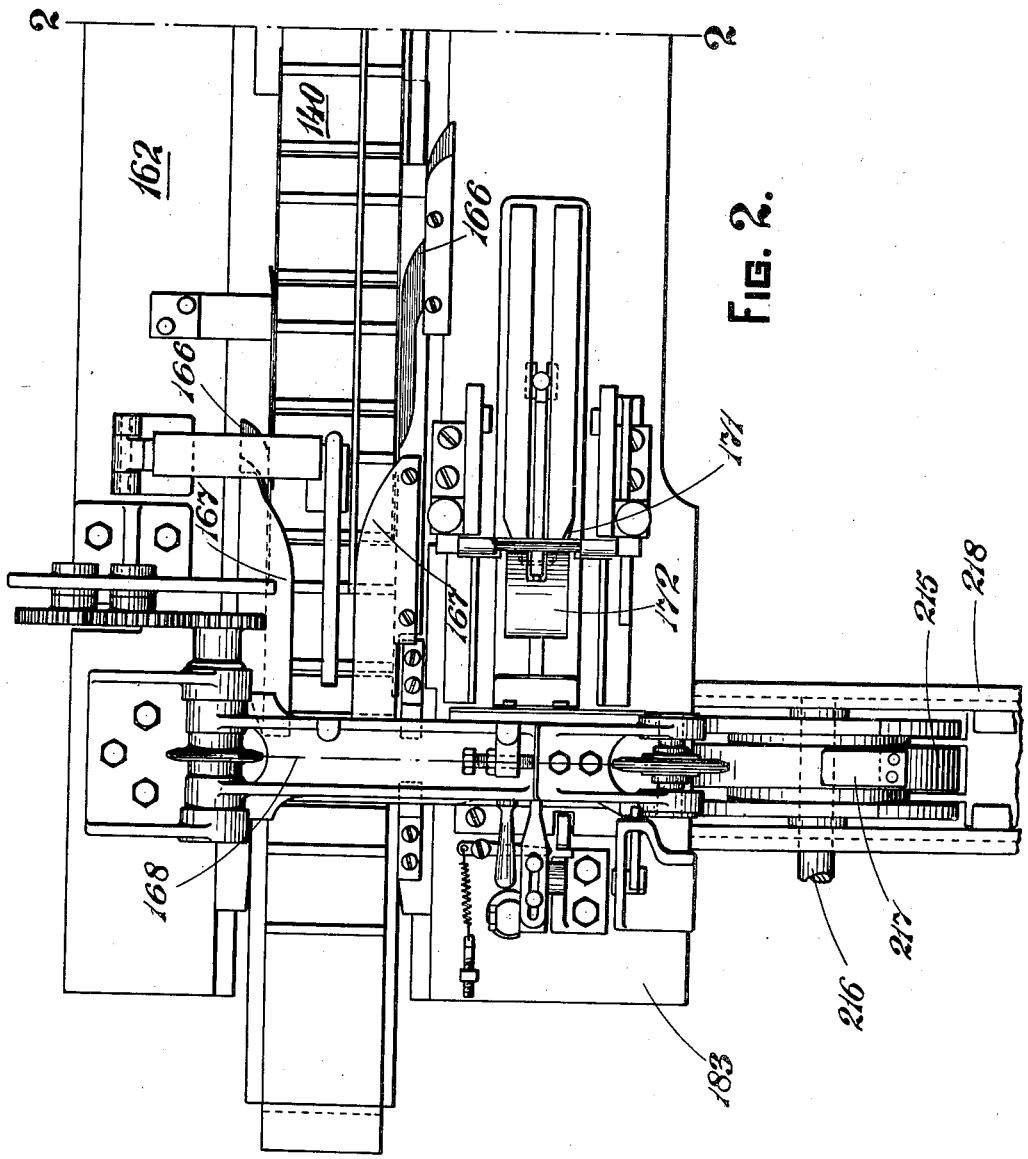
Figure 2 is a plan to a larger scale of the portion to the left of line 2—2, Figure 1.

This is illustrated in Figures 1, 2, and 22, and consists of an endless chain 168 mounted on two sprocket wheels 169. The chain moves continuously and is furnished with a pusher 170, Figure 22, and the parts are so arranged and timed that the pusher travels through a pocket 140 and sweeps out a loaded slide while the intermittent conveyor 161 is stationary. An open shell is brought into position in the path of the moving slide and the latter is thrust into it and the complete article passes into a delivery wheel.

*Shell feed*

Figure 21:
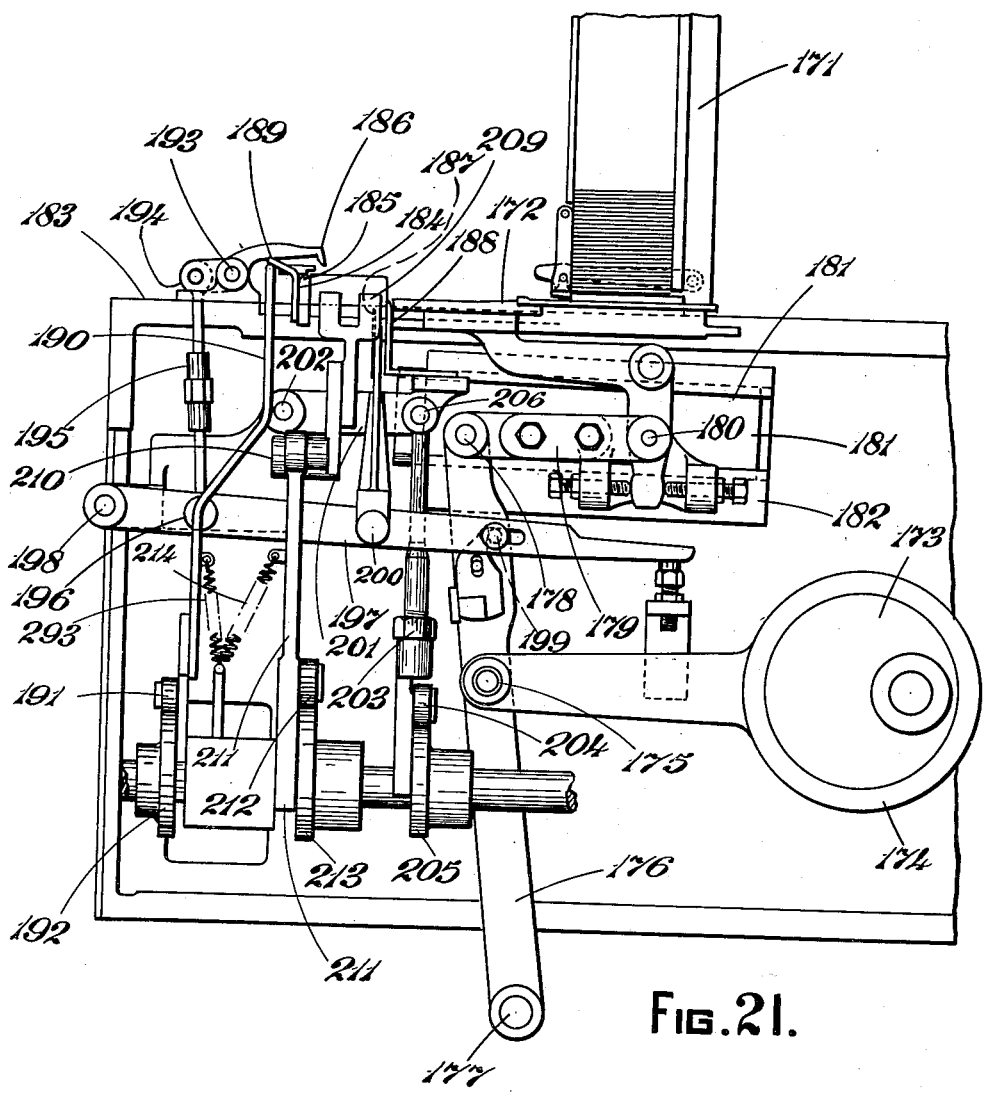
Figure 21 is a side elevation taken in the direction of arrow "E", Figure 1, and shows shell feed mechanism.

Collapsed tubular shells are stacked in a magazine 171, Figure 21, and removed one at a time by a feed tooth or finger 172. The shells are placed laterally in the magazine, that is, the tube is transverse to the direction of movement. The finger is reciprocated by an eccentric 173 having a strap 174, the end of which is attached at 175 to a lever 176 which is pivoted at 177 to the machine frame. The upper end of the lever is connected at 178 to a link 179 which is pivoted at 180 to a slide 181 working in guides 182. The slide 181 carries the feed finger. It will be noticed from Figure 21 that the feed finger is stepped so that it has two feed teeth, one being the step and the other being the end of the tooth. The step feeds a flat shell out of the magazine to a certain position and on the next stroke the shell is engaged by the end of the tooth and moved a further distance during which latter movement it is opened and squared up to rectangular form. The end of the tooth pushes the slide over a table 183 until it meets a pivoted abutment 184 which at that time is so positioned that it forms an obtuse angle with the surface of the table. This causes the leading edge of the shell to ride over the abutment until it lodges in a fixed corner or recess 185. Then the abutment 184 is mechanically turned on its pivot to take up the vertical position shown in Figure 21, and meanwhile pressing members 186 and 187 bend or distort the shell so that it is convex downward at the part near recess 185 and convex upwardly at the part near the feed tooth. The curves are only slight, but the effect is such that the continued pressure of the feed tooth causes the shell to open and a narrow panel of the shell to lie against the abutment 184 and follow its movement. When the shell is almost fully open a guide 188 moves up a short distance above the table 183 and forms a low wall parallel to the abutment 184 and completely squares up the shell, the abutment 184, table 183 and guide 188 occupying at this stage positions in three planes formed by three adjacent sides of the open shell.

The various members just described are operated in the following manner:—

The abutment 184 is pivoted at a point near the recess 185 and has a tail 189 which is pressed by a rod 190 to cause the abutment to assume the vertical position. The rod 190 has a roller 191 attached to it which runs on a cam 192 so that the necessary movement is imparted to the abutment, the return movement being by a spring 293.

The pressing member 186 is pivoted at 193 and has a tail 194 which engages with a rod 195. The rod is pivoted at 196 to a lever 197 which is in turn pivoted at 198 to the machine frame. The lever 197 is oscillated on its pivot by the lever 176 to which it is connected at 199 by a pin and slot connection. The pressing member 187 is also connected at 200 to the lever 197 so that as the eccentric 173 rotates both pressing members are caused to rise and fall as desired. The wall or guide 188 is fixed to a lever 201 which is pivoted at 202 to the machine frame and a cam rod 203 having a roller 204 which engages a cam 205 is connected at 206 to the lever 201. Movement of the cam causes the wall to rise about ⅛" above the table and to fall beneath the level thereof. After the shell has been opened in the manner described it is thrust on to a mouthpiece through which the loaded slide is passed to assemble the slide and the shell.

*Slide and shell assembly*

Referring to Figure 23 which is a similar view to Figure 22 a mouthpiece 207 is fixed to the bed of the machine in the path of the pusher 170. The mouthpiece consists of a rectangular frame having a rectangular aperture in it of such dimensions that the loaded slide may just pass through. The upper part of the rectangle is slotted to clear the portion of the pusher 170 which is attached to the conveyor chain 168 and tapering spring blades 208 are attached to the frame 207 so that a species of tapering funnel is formed through which the slide passes, forcing the springs apart in its transit. The opened shell is pressed on to the tapering springs by a forked lever 209 which is pivoted at 210 to a bracket fixed on the machine bed. The lever 209 is in the form of a bell crank, see Figure 23, and a cam rod 211 engages its other end. This rod has a roller 212, Figure 21, which engages a cam 213 and a spring 214 is also attached to the cam rod. As the cam rotates the fork 209 oscillates about the centre 210 and thus moves out of the way of a shell during the opening operation and presses it on to the mouthpiece as soon as the operation is finished.

The pusher 170 carries a loaded slide out of a stationary pocket 140 and thrusts it through the mouthpiece into the shell. At the instant the two parts are completely assembled the fork 209 is caused to move out of contact with the end of the shell and permit the complete packet to pass along to a delivery wheel 215, see Figure 22.

*Delivery wheel*

This is mounted on a spindle 216, Figure 22, and is continuously rotated. It has two pockets 217 adapted to receive completed packets as they are discharged from the assembly position by the pusher 170 and the wheel is driven at such speed that the packets are delivered properly into the pockets of the wheel. The wheel delivers the packets into a trough 218, suitable strippers being provided which strip the packets from the pockets and leave them standing vertically in the trough. The periphery of the wheel has cam faces 219 formed on it which engage the packet as soon as it is delivered to the trough and press it forwards. In this way a horizontal column of packets is continually formed and moved along the trough so that the operator may remove batches of packets from the forward end of the column.

In a slightly modified way of carrying the invention into effect the cigarettes are fed from the hopper as above described and carried towards a further bed in which a mould chain (of the same general construction as the conveyor 161 carrying the pockets 140) adapted to move intermittently in a direction transverse to the direction of movement of the cigarettes, is arranged to receive the batches of cigarettes and carry them through subsequent operations.

At the point where the cigarettes are delivered to the mould chain, two reels of wrapping material, such for instance, as tin or like foil, are arranged above the bed of the machine in staggered formation as previously described and are placed one behind the other.

The two webs are fed together between feeding rollers which feed them simultaneously to any suitable cutting mechanism, for example, the cutting mechanism shown in Figure 6, which serves the twin web into lengths suitable to form a wrapper which will completely envelop a batch of cigarettes when it is folded about them.

Owing to the staggered formation of the reels, the two webs of wrapping material overlap each other when they are fed to the feeding rollers.

After the wrapping material has been severed from the web, it is fed by any suitable means, for example, a suction device on to the surface of a plate in which a hole corresponding to the size of a batch of cigarettes is cut, the said plate being placed above the pockets of the mould chain above referred to so that the cigarettes being delivered from the hopper are fed on to the surface of the wrapping material when it is resting upon the plate. When these cigarettes have been placed in position, as above described, a cam operated plunger is arranged to descend and plunge the cigarettes and wrapping material through the slot in the plate and into a pocket of the mould chain in the same way as the slide is pressed into the pocket as previously described with reference to Figures 19 and 20. This action causes the wrapping material to assume a U formation about the batch of cigarettes, one arm of the U being of a length approximately equal to the depth of the batch of cigarettes, whilst the other arm is of such length that it may be subsequently folded across the uppermost face of the batch of cigarettes, and also extend downwardly over the other arm of the U.

The pocket containing the batch of cigarettes and the wrapping material folded into the U formation is then moved a further stage by a movement of the intermittent conveyor and the upstanding long arm of the U is folded downwardly across the face of the batch of cigarettes by the edge of the slot in the plate above referred to.

The portion of wrapping material lying across the face of the batch extends rearwardly of the pocket, and the rear wall of the pocket is made movable and is controlled by springs. The moment the rear portion of the pocket emerges from beneath the plate and assumes a stationary position, a cam operated lever engages with a projection extending rearwardly of the movable wall of the pocket referred to, and pulls the said wall backwardly for a short distance, thus leaving a gap between the rear wall of the pocket and the batches of cigarettes contained therein.

During the period that this gap is formed, a cam operated retaining pawl is adapted to protrude through the bed of the machine, and engage the short arm of the U of the wrapper and retain the batch of cigarettes and the upwardly folded portion of the wrapper, in order to prevent their becoming displaced owing to the rear wall being removed. Whilst this retainer is in position, a cam operated tucker arranged to oscillate above the batch contained in the pocket descends and folds downwardly the outwardly extending portion of the wrapper above referred to.

When the wrapper has been folded downwardly the tucker returns to its normal position and traverses a vertical path whilst the retaining pawl is removed and the rear wall of the pocket is returned to its normal position under the influence of the controlling springs.

It will be appreciated that the tucking operations just described very closely resemble the operations described with reference to Figures 7 and 8.

If desired, the upstanding arms of the U may be made of equal lengths and the two arms folded downwardly one upon the other on to the upper face of the batch of cigarettes. In this case the leading arm of the U is folded down by the plate and the other arm by a mechanically operated folder or both may be folded down by such folders. The subsequent folding of the end folds of the wrapper is the same in all cases.

The batch of cigarettes contained in the partly folded wrapper is now conveyed through folders mounted on the bed of the machine, the said folders being arranged to complete the folding operations by tucking in and folding up the end folds of the wrapper. These folders may be of the same general construction as those described with reference to Figures 4, 6, or 18. The intermittent conveyor then carries the completed batch to a position at which a further continuous conveyor similar to the conveyor 168 is mounted above the bed of the machine and operated in a direction at right angles to that of the previous conveyor. This conveyor has pusher pieces mounted upon it which pass through the pockets of the previous conveyor and remove the batch contained therein and deliver it into the pocket of another intermittent conveyor. This conveyor is identical with the conveyor 161 carrying the pockets 140 and all the other operations of feeding the slide, folding the flaps of the slide, feeding and opening the shell and inserting the loaded slide therein take place exactly as previously described with reference to the illustrated embodiment.

Hitherto in the constructions described the wrapping material has been so applied to the batch that the ends of the cigarettes are covered by folds or flaps of the material, but it will be easily understood that the wrapping may be of the well known type usually described as block ended.

In this form of the invention, two portions of wrapping material which constitute the complete wrapper may be formed as block ended cups about the batch of cigarettes, the said cups overlapping each other and so forming a complete wrapper as was the case with the machine above referred to.

In this case the cigarettes are fed from a hopper by a continuous conveyor and a strip of wrapping material is severed from a reel and placed in the path of the conveyor so that the oncoming batch of cigarettes meets the severed strip of wrapping material and forms it into a U shape about the ends of the cigarettes. The conveyor then takes the cigarettes and wrapping material through folders which fold the outwardly extending portions of the wrapping material about the cigarettes. This portion of wrapping material envelops a little more than one-half of the batch of cigarettes, leaving the other end of the batch exposed.

The batch is now delivered into the pocket of a turn-table which is rotated through 90° in an anti-clockwise direction and a plunger then removes the partly wrapped batch and deposits it on a further bed of the machine so that the unwrapped end of the batch is in the leading position.

A continuous conveyor having pusher pieces is adapted to engage the wrapped end of the batch and convey the batch along the bed until it meets a further strip of foil which has been severed and placed in the path of the oncoming batch in a manner similar to that just described. The fresh piece of wrapping material is thereafter wrapped around the cigarettes by suitable folding mechanism and also envelopes a little more than one-half of the batch of cigarettes so that it overlaps the previously applied portion of wrapping material and the batch of cigarettes is as a consequence completely enveloped by the two pieces of wrapping material.

After the wrapping operations have been completed, the wrapped batch is delivered into a pocket 140 of conveyor 161 and is conveyed through the mechanism which inserts the wrapped batch of cigarettes into a container of the slide and shell type exactly in the manner previously described.

It will be understood that it is possible to envelop the batch of cigarettes in two portions of wrapping material so that one is formed as a block ended cup as just described, whilst one has end folds similar to those described in the first example given in this specification by obvious selection and combination of the machine units above described.

Again, if desired, the side and end folds of the wrapper may be secured together by any suitable adhesive.

The container may be of any kind and is not necessarily a slide and shell carton. For example, a double pocket type of container may be used, each pocket containing a single row of cigarettes wrapped in any of the ways above described. The wrapped batches are delivered to container blanks which are then folded up to enclose them, suitable mechanism for the folding operation being fully described in United States Patent No. 1,926,493.

What I claim as my invention and desire to secure by Letters Patent is:

1. In a wrapping machine the combination with means to feed a wrapper transversely into the path of an article of a conveyor to move an article into engagement with the wrapper, elements co-operating with said conveyor to fold the wrapper into U form about the article, a guide through which the wrapper is fed into the path of the article, said guide being movable in the direction of movement of the wrapper being so fed and a folding element movable with said guide and operative to fold a part of a previously fed wrapper formed into a U about the article.

2. In a wrapping machine the combination with means to feed a wrapper transversely into the path of an article of a reciprocating plunger to move an article into engagement with the wrapper, elements, co-operating therewith to fold the wrapper into U form about the article, the limbs of the U extending beyond the rear face of the article considered in the direction of movement thereof, a guide through which the wrapper is fed into the path of the article, said guide being movable in the direction of movement of the wrapper being so fed, a folding element movable with said guide to fold downwardly the projecting portion of the upper limb of the U, and a conveyor movable in timed relationship with said folding element to engage and continue the movement of the article during the return stroke of the plunger, said conveyor being operative to fold the extending portion of the lower limb of the U upwardly towards the rear face of the article.

3. In a wrapping machine the combination with means to feed a wrapper transversely into the path of an article of a reciprocating plunger to move an article into engagement with the wrapper, elements co-operating therewith to fold the wrapper into U form about the article, the limbs of the U extending beyond the rear face of the article considered in the direction of movement thereof and folding elements operative to fold the upper and lower projecting portions downwardly and upwardly respectively to form the wrapper into a tube about the article, one of said elements comprising a conveyor movable in timed relationship with said plunger to continue the movement of the article in the direction in which it is moved by the plunger.

4. In a wrapping machine the combination with means to feed a wrapper transversely into the path of an article of a reciprocating plunger to move an article into engagement with the wrapper, elements co-operating therewith to fold the wrapper into U form about the article, the limbs of the U extending beyond the rear face of the article considered in the direction of movement thereof and folding elements operative to fold the upper and lower projecting portions downwardly and upwardly respectively to form the wrapper into a tube about the article, one of said elements comprising a conveyor movable in timed relationship with said plunger to continue the movement of the article in the direction in which it is moved by the plunger, said conveyor being movable lengthwise of a support movable in a direction at right angles to the direction of movement of the conveyor whereby the conveyor is caused to move in a rectilinear path.

5. In a wrapping machine the combination with means to feed a wrapper transversely into the path of an article of a reciprocating plunger to move an article into engagement with the wrapper, elements co-operating therewith to fold the wrapper into U form about the article, the limbs of the U extending beyond the rear face of the article considered in the direction of movement thereof and folding elements operative to fold the upper and lower projecting portions downwardly and upwardly respectively to form the wrapper into a tube about the article, one of said elements comprising a conveyor movable in timed relationship with said plunger said conveyor having two pusher faces operative in succession to engage an article and to continue the movement of the article in the direction in which it is moved by the plunger.

6. In a wrapping machine the combination with means to feed a wrapper transversely into the path of a batch of superimposed cigarettes of a conveyor to move the cigarettes transversely of the lengths into engagement with the wrapper and opposed elements between which the batch is passed to retain the cigarettes against said conveyor as the batch is moved towards and into engagement with the wrapper, said elements being yieldable towards and away from each other in a plane transverse to the direction of movement of the conveyor.

7. In a wrapping machine the combination with a support for an article of a conveyor to move an article over said support, a carrier for the conveyor, means to move the conveyor relatively to and lengthwise of the carrier, means to move the carrier in a direction at right angles to the direction of movement of the conveyor and in timed relationship therewith whereby the conveyor is caused to move in a rectilinear path, a passage in said support through which the conveyor moves whilst moving an article over the support, a bridge pivoted to and forming part of said support, said bridge being rotated about its pivot in timed relationship with the conveyor to permit the conveyor to be raised above the surface of the support and means to permit the conveyor to be lowered beneath the support at the end of its movement over the support.

8. In a wrapping machine, means to feed a wrapper transversely into the path of a batch of superimposed cigarettes, a conveyor to move the cigarettes transversely of their lengths into engagement with the wrapper, and a passage through which the bath is passed, said passage converging in the direction of movement of the batch of cigarettes and comprising opposed yielding walls which retain the cigarettes against the conveyor as the batch is moved towards and into engagement with the wrapper.

9. In a wrapping machine, means to feed a wrapper transversely into the path of a batch of superimposed cigarettes, a conveyor to move the cigarettes transversely of their lengths into engagement with the wrapper, a passage of substantially uniform cross-sectional area through which the batch is moved by the conveyor, and yieldable elements protruding into the passage from opposed sides thereof to engage the batch of cigarettes on opposed sides and to retain the cigarettes against said conveyor as the batch is moved towards and into engagement with the wrapper.

10. In a wrapping machine, folding elements to fold wrapping material about an article, means to present an article and wrapping material to the folding elements and means to feed two portions of wrapping material into the path of the article to be wrapped, said last named means including two sources of wrapping material disposed above the path of the article to be wrapped, the greater part of each source being located on opposite sides of the longitudinal center line of said path, the smaller part of each source being located on that side of said line on which is located the larger part of the other source, whereby when each portion of wrapping material is engaged by the article one edge of one portion of wrapping material is disposed between two opposed edges of the other portion.

11. In a wrapping machine, two reels each containing a web of wrapping material, a support for each reel about which support the reel is rotatable, said reels being mounted so as to be displaced relatively to each other in the direction of their axes of rotation, means operative simultaneously to draw the web from each reel and to feed the webs downwardly in a path transverse to that in which an article to be wrapped is moved, the extent of the displacement of the webs being such that the greater part of the width of each web is located on opposite sides of the longitudinal center line of said path, the smaller part of the width of each web being located on that side of said line on which is located the greater part of the width of the other web, whereby one web partly overlaps the other to form a composite web, means to sever a wrapper from the composite web, means to move an article into engagement with said wrapper substantially at the instant the wrapper is severed from the composite web to prevent substantial displacement of the parts comprising the wrapper, and means completely to fold the wrapper about the article.

JOHN WALKER CHALMERS.